United States Patent
Kobayashi et al.

(10) Patent No.: US 6,605,231 B2
(45) Date of Patent: Aug. 12, 2003

(54) VIBRATION DAMPING SILICONE COMPOSITION

(75) Inventors: Hideki Kobayashi, Chiba Prefecture (JP); Masayuki Hayashi, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/891,901

(22) Filed: Jun. 26, 2001

(65) Prior Publication Data

US 2002/0032128 A1 Mar. 14, 2002

(30) Foreign Application Priority Data

Jul. 31, 2000 (JP) ........................................ 2000-232244

(51) Int. Cl.[7] .................................................. E04B 1/74
(52) U.S. Cl. ......................................... 252/62; 524/425
(58) Field of Search ............................. 524/425; 252/62

(56) References Cited

U.S. PATENT DOCUMENTS

| | | | |
|---|---|---|---|
| 3,894,169 A | 7/1975 | Miller ......................... 428/425 |
| 4,374,950 A | 2/1983 | Shimizu ....................... 524/765 |
| 4,416,790 A * | 11/1983 | Schurmann et al. .......... 252/62 |
| 4,514,529 A * | 4/1985 | Beers et al. ................. 523/200 |
| 4,678,828 A | 7/1987 | Nakamura et al. ........... 524/265 |
| 5,186,849 A * | 2/1993 | Toya et al. ................... 252/21 |
| 5,229,216 A * | 7/1993 | Watanabe et al. ............ 428/489 |
| 5,342,721 A | 8/1994 | Akamatsu ................... 430/108 |
| 5,550,185 A | 8/1996 | Inoue et al. ................. 524/847 |
| 5,661,203 A * | 8/1997 | Akamatsu et al. ........... 524/269 |
| 5,745,472 A | 4/1998 | Son ............................. 369/263 |
| 5,840,220 A | 11/1998 | Akamatsu et al. ............. 264/15 |
| 5,856,396 A | 1/1999 | Vipperman ................. 524/425 |
| 6,347,411 B1 * | 2/2002 | Darling ......................... 2/272 |

FOREIGN PATENT DOCUMENTS

| | | | |
|---|---|---|---|
| EP | 0 635 549 B1 | 7/1994 | ........... C08L/83/04 |
| EP | 0 651 020 A2 | 3/1995 | ........... C08L/83/04 |
| EP | 0 990 816 A1 | 9/1999 | ............. F16F/9/00 |
| EP | 990 816 * | 5/2000 | |
| JP | 2000-80277 | 3/2000 | ........... C08L/83/04 |
| WO | WO 97/16480 | 9/1997 | ............. C08K/3/26 |

OTHER PUBLICATIONS

Abstract JP 9263525 Oct. 1997.
Abstract JP 10–251517 Sep. 1998.
JP 11182624 Abstract Jul. 1999.
JP 2000 80277 Abstract Mar. 2000.
JP 62–113932 Abstract May 1987.
Abstract 63–308242, Dec. 1988.
Abstract 63–308241, Dec. 1988.
0774488 Abstract.

* cited by examiner

*Primary Examiner*—Margaret G. Moore
(74) *Attorney, Agent, or Firm*—Jim L. DeCesare; Roger E. Gobrogge; Patricia M. Scaduto

(57) ABSTRACT

A vibration damping silicone composition having excellent vibration damping ability and good storage stability contains (A) a silicone oil, (B) calcium carbonate powder, (C) a solid inorganic material powder other than powder (B) having a mean particle size of 20–200 μm, and (D) a fatty acid or fatty acid derivative.

6 Claims, No Drawings

VIBRATION DAMPING SILICONE COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a vibration damping silicone composition, and in particular to a vibration damping silicone composition with excellent storage stability.

BACKGROUND OF THE INVENTION

Vibration damping compositions containing silicone oils and solid powders are known. For example, a vibration damping composition containing silicone oil and a powdered solid such as powdered silica, powdered glass, or powdered silicone resin, is shown in Japanese Patent Application Publication No. Sho 63-308241(Kokai). A vibration damping composition containing silicone oil and a powdered organic resin such as an acrylic resin having a glass transition point within the use temperature, is shown in Japanese Patent Application Publication No. Sho 63-308242 (Kokai). However, these vibration damping compositions have poor storage stability or result in oil separation when stored for extended periods.

BRIEF SUMMARY OF THE INVENTION

It is therefore an object of the invention to provide a vibration damping silicone composition offering excellent damping of vibration and storage stability.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The invention relates to a vibration damping silicone composition containing:

(A) 100 parts by weight of a silicone oil;
(B) 10–300 parts by weight of calcium carbonate powder;
(C) 1–300 parts by weight of a solid inorganic material powder other than the powder used in (B), having a mean particle size of 20–200 $\mu$m; and
(D) 0.1–20 parts by weight of a fatty acid or fatty acid derivative.

Silicone oil of component (A) is an organopolysiloxane that is liquid at room temperature, and it functions as a medium for dispersing the powdered solids of components (B) and (C). The organic groups bonded to the silicon atom in such organopolysiloxanes can be alkyl groups such as methyl, ethyl, and propyl; alkenyl groups such as vinyl, allyl, and butenyl; aryl groups such as phenyl and tolyl; halogenated alkyl groups such as 3,3,3-trifluoropropyl; or other unsubstituted monovalent hydrocarbon radical. Additionally, a small amount of hydroxy groups or alkoxy groups such as methoxy and ethoxy, may also be present. Alkyl groups, and the methyl group in particular, are preferred however, as such compositions will have negligible temperature dependence on viscosity, and a better storage stability.

The organopolysiloxane molecular structure may be linear, linear with some branching, branched, or cyclic, but a linear structure is preferred. In preferred embodiments, the kinematic viscosity at 25° C. should be in the range of 100–1,000,000 mm$^2$/s, more preferably 500–500,000 mm$^2$/s. This is because the powdered solids of components (B) and (C) cannot be readily maintained in a dispersed state where the viscosity is below about 100 mm$^2$/s, whereas above 1,000,000 mm$^2$/s, process ability is impaired and it becomes increasingly difficult to evenly disperse the powdered solids of components (B) and (C), in component (A). Silicone oils suitable as component (A) are, for example, trimethylsiloxy end-capped dimethylpolysiloxane, dimethylvinylsiloxy end-capped dimethylpolysiloxane, silanol end-capped dimethylpolysiloxane, and trimethylsiloxy end-capped dimethylsiloxane/methylphenylsiloxane copolymer.

Calcium carbonate powder of component (B) improves the vibration damping of the composition. Examples of component (B) are heavy calcium carbonate powder and light calcium carbonate powder. Heavy calcium carbonate powder is known as powdered calcium carbonate, and can be produced by the mechanical comminution and classification of white limestone. Heavy calcium carbonate powders are available commercially under names such as WHITON P-30 from Toyo Fine Chemicals and NANOX #30 from Maruo Calcium. Heavy calcium carbonate powders which have been surface treated with component (D) will have exceptional dispersion stability in component (A).

Light calcium carbonate powder known as precipitated calcium carbonate can be produced by dewatering and drying a light calcium carbonate slurry prepared by reacting fine limestone with $CO_2$. Light calcium carbonate powders are available commercially under names such as HAKUENKA CC from Shiraishi Calcium and CALFINE 200 from Maruo Calcium. Light calcium carbonate powders which have been surface treated with component (D) have exceptional dispersion stability in component (A).

Calcium carbonate powder of component (B) should have a mean particle size of 0.01–300 $\mu$m, particularly 0.01–100 $\mu$m. Its morphology may be spherical, flat, or amorphous. Component (B) can be included as a component of the composition in amounts of 10–300 parts by weight, preferably 20–250 parts by weight per 100 parts by weight of component (A). This is because vibration damping provided by the composition is decreased using amounts less than 10 parts by weight, whereas processing becomes more difficult using amounts exceeding 300 parts by weight.

Solid inorganic material powder of component (C) functions to further improve the vibration damping ability of the composition. Component (C) includes any finely divided inorganic material, other than calcium carbonate powder, having a mean particle size of 20–200 $\mu$m and that will not liquefy at temperatures below 200° C. Its morphology may be spherical, flat, or amorphous. Some examples are glass beads, clay, bentonite, diatomaceous earth, and powdered quartz. Component (C) can be included in amounts of 1–300 parts by weight, preferably 1–100 parts by weight, per 100 parts by weight of component (A). This is because the vibration damping ability of the composition decreases using amounts less than 1 parts by weight, whereas processing becomes more difficult using amounts exceeding 300 parts by weight.

Calcium carbonate powder of component (B) and solid inorganic material powder of component (C) should differ in mean particle size, such that the difference between mean particle size of component (B) and mean particle size of component (C) is at least 10 μm. Thus, it is preferred to use as component (B) calcium carbonate powder with a mean particle size of 0.01–30 μm, and as component (C) a spherical inorganic material powder with a mean particle size of 40–200 μm, most preferably spherical glass beads. The total amount of component (B) and component (C) should be 21–450 parts by weight per 100 parts by weight of component (A).

Fatty acid or fatty acid derivative of component (D) functions to improve the storage stability of the composition. Some examples of component (D) are capric acid, lauric acid, myristic acid, palmitic acid, stearic acid, oleic acid, linoleic acid, cerotic acid, behenic acid, elaidic acid, and arachidic acid, and their alkali metal salts, alkaline earth metal salts, and metal salts. $C_{6-31}$ fatty acids or their derivatives are especially preferred. Component (D) can be included in amounts of 0.1–20 parts by weight, preferably 0.2–18 parts by weight, per 100 parts by weight of component (A). This is because the storage stability of the composition decreases using amounts less than 0.1 parts by weight, whereas the vibration damping ability decreases using amounts exceeding 20 parts by weight.

In addition to components (A) to (D), the composition may optionally contain organic resin powders such as acrylic resin powders, fluororesin powders, and phenolic resin powders; antioxidants; corrosion inhibitors; flame retardants; pigments; and dyes.

The composition should be used as a viscous paste or be semi-solid at room temperature. It can be prepared by homogenizing components (A) to (D). Mixing means which can be used include compounding devices such as a ball mill, vibration mill, kneader-mixer, screw extruder, paddle mixer, ribbon mixer, Banbury mixer, Ross mixer, Henschel mixer, flow jet mixers, Hobart mixer, or roll mixer. The composition can be heated during mixing at a temperature of 30–200° C.

The composition possesses excellent vibration damping and storage stability, and has negligible temperature dependence with respect to its vibration damping ability. The composition can be sealed in an elastomeric package such as a rubber bag or rubber tube, and used as a buffering element in compact disk players, compact disk changers, mini-disk players, car navigation devices, or other electrical or electronic devices exposed to significant changes in temperature.

EXAMPLES

The following examples illustrate the invention in more detail. Viscosity and kinematic viscosity measurements in these Examples were made at 25° C. The vibration damping ability of the vibration damping compositions was determined by measuring the loss tangent (tan δ) at −20° C., 25° C., and 60° C. The tan δ measurements were carried out using the plate method with a DYNAMIC ANALYZER Model RDA-7000 manufactured by Rheometric Scientific. The measurement conditions included the use of a 20 mm plate diameter; 10 kHz frequency, 20 percent strain; and a one mm sample thickness. The ratio versus tan δ at 25° C. (tan δ/tan δ (25° C.)) was calculated from the result.

Example 1

To a mixer were charged 100 g of a dimethylpolysiloxane end capped at both of it terminals with trimethylsiloxy groups and having a viscosity of 7000 mm²/s; 190 g of amorphous heavy calcium carbonate with a mean particle size of 20 μm; 34 g of spherical glass beads with a mean particle size of 80–110 μm; and 17 g of zinc stearate. The material was kneaded for 2 hours at 150 rpm, while scraping material from the wall of the mixer every 30 minutes. The vibration damping ability of the resulting vibration damping composition was measured, and is shown in Table 1. The composition was placed in a pail and stored for 2 months, and even after two months no oil floated to the surface, demonstrating good storage stability.

Example 2

To a mixer were charged 100 g of a dimethylpolysiloxane end capped at both of its terminals with trimethylsiloxy groups and having a viscosity of 7000 mm²/s); 190 g of heavy calcium carbonate having its surface treated with a higher fatty acid, and having a mean particle size 4.3 μm and a BET specific surface area of 3.4 m²/g; 34 g of spherical glass beads having a mean particle size of 80–110 μm; and 17 g of zinc stearate. The material was kneaded for 2 hours at 150 rpm while scraping material from the wall of the mixer every 30 minutes to produce a vibration damping silicone composition. The vibration damping ability of the composition was measured, and the results are shown in Table 1. The composition was placed in a pail and stored for 2 months, and it was found that even after two months, no oil floated to the surface which demonstrates good storage stability.

Example 3

To a mixer were charged 100 g of a dimethylpolysiloxane end capped at both of its terminals with trimethylsiloxy groups and having a viscosity 7000 mm²/s; 190 g of light calcium carbonate having its surface treated with a higher fatty acid, and having a mean particle size of 0.12 μm which was calculated from its BET specific surface area of 18 m²/g; 34 g of spherical glass beads having a mean particle size of 80–110 μm; and 10 g of zinc stearate. The material was kneaded for 2 hours at 150 rpm while scraping material from the wall of the mixer every 30 minutes, to produce a vibration damping silicone composition. The vibration damping ability of the composition was measured and the results are shown in Table 1. The composition was placed in a pail and stored for 2 months. Even after two months, no oil floated to the surface, showing its good storage stability.

Comparison Example 1

A vibration damping silicone composition was prepared according to Example 1 except that 34 g of spherical glass beads was omitted. The vibration damping ability of this comparative composition was measured, and the results are shown in Table 1.

Comparison Example 2

A vibration damping silicone composition was prepared as in Example 1 except that the 17 g of zinc stearate was omitted. The comparative composition was placed in a pail and stored for 2 months. After two months, oil had floated to the surface demonstrating the poor storage stability of the comparative composition.

TABLE 1

| | Vibration damping at 25° C. (tan δ) | Vibration damping (tan δ/tan δ (25° C.)) | |
|---|---|---|---|
| | | −20° C. | 60° C. |
| Example 1 | 12.5 | 0.47 | 1.3 |
| Example 2 | 13.1 | 0.47 | 1.4 |
| Example 3 | 11.0 | 0.50 | 1.1 |
| Comp. Example 1 | 9.2 | 0.43 | 1.7 |

Vibration damping silicone compositions according to this invention containing components (A) to (D) possess excellent storage stability and vibration damping ability, and have a low temperature dependent vibration damping ability.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A vibration damping silicone composition comprising:
   (A) 100 parts by weight of a silicone oil;
   (B) 10–300 parts by weight of calcium carbonate powder;
   (C) 1–300 parts by weight of a solid inorganic material powder having a mean particle size of 20–200 μm selected from the group consisting of glass beads, clay, bentonite, diatomaceous earth and powdered quartz; and
   (D) 0.1–20 parts by weight of a fatty acid or a fatty acid derivative.

2. A vibration damping silicone composition according to claim 1 in which component (B) is heavy calcium carbonate powder.

3. A vibration damping silicone composition according to claim 1 in which component (B) is light calcium carbonate powder.

4. A vibration damping silicone composition according to claim 1 in which the surfaces of component (B) are treated with component (D).

5. A vibration damping silicone composition according to claim 1 in which component (C) is glass beads.

6. A vibration damping silicone composition according to claim 1 in which the difference between the mean particle size of component (B) and the mean particle size of component (C) is at least 10 μm.

* * * * *